2,852,478
Patented Sept. 16, 1958

2,852,478

POLYPHASE COPOLYMERIZATION OF STYRENE COMPOUNDS WITH DRYING OIL FATTY ACID COMPOUNDS

Cornelis Boelhouwer, Delft, Freerk Anne De Roos, Naarden, and Hein Israel Waterman, Delft, Netherlands, assignors to Shell Development Company, Emeryville, Calif., a corporation of Delaware No Drawing. Application December 14, 1953
Serial No. 398,194

Claims priority, application Netherlands
December 19, 1952

3 Claims. (Cl. 260—23)

This invention relates to a process for the copolymerization of styrenes with drying oil fatty acid compounds to obtain products which dry in air.

It is well known that products which are suitable for paints and varnishes can be obtained by copolymerizing a styrene compound with a drying oil fatty acid compound, for example, a drying oil or fatty acid derived therefrom, a drying oil-modified alkyd resin, or a drying oil-modified polymeric polyhydric alcohol. The copolymers obtained by the prior art processes often have an appearance of turbidity caused by soluble, high molecular products with a high content of styrene. These high molecular products are hereinafter referred to as "polystyrenes" although they do not consist exclusively of styrene compounds. The resulting copolymers are not as soluble in aliphatic solvents as is desirable for general use in paints and varnishes. Several processes have been proposed for effecting the copolymerization without the formation of substantial amounts of undesirable polystyrene compounds. However, these processes generally have various disadvantages. For example, the reaction time is often very long, amounting to 20 to 25 hours or more. The necessity of adding large quantities of solvent is another disadvantage of the known processes. It has also been proposed to employ a mixture of styrene and alpha-methyl styrene, however, the use of such a mixture is much more expensive than the use of the cheaper component, styrene, alone. In all of the prior art processes the copolymerization has been carried out employing the styrene compound in the liquid state.

In accordance with the present invention, it has now been found that improved copolymers of styrene compounds with drying oil fatty acid compound can be obtained by carrying out the copolymerization reaction employing the styrene compound in the vapor state.

According to a preferred embodiment of the present invention, improved copolymers of a styrene compound, preferably styrene, and a drying oil or drying oil fatty acid, can be obtained by effecting the copolymerization employing the styrene compound in the vapor state.

In carrying out the copolymerization reaction in accordance with the present invention, the styrene compound is generally vaporized in a stream of an inert gas and then passed through the unsaturated fatty acid compound which is maintained at a temperature of between about 150° C. and the boiling point of the fatty acid compound, preferably between about 200° C. and about 300° C. If necessary or desirable, the fatty acid compound can be dissolved in a suitable solvent. The copolymerization reaction can be carried out with or without a conventional polymerization catalyst.

The inert carrying gas should preferably not be soluble in the fatty acid compound to any considerable extent so that any unreacted styrene compound can be removed from the reaction mixture by means of the carrying gas. In general, nitrogen is a satisfactory carrying gas.

Care must be taken to prevent reflux in the reaction mixture of any of the styrene compounds which may have condensed to the liquid state. Such reflux can be avoided by heating the entire reaction vessel, for example, by completely immersing the reaction vessel in a liquid bath. It is also possible to design the reaction vessel to provide for the removal of liquefied styrene compound. For example, the reaction vessel can be provided with a channel near the upper, unheated portion, in which channel the liquid styrene compound collects and from which the collected liquid is discharged.

In order to insure a smooth reaction, it is generally desirable to employ a considerable excess of the styrene compound. Preferably from about 10 to about 20 times the amount of the styrene compound which can be absorbed by the unsaturated fatty acid compound is employed. The recovered, unreacted styrene compound can be recycled to the copolymerization zone. In some cases, it may be desirable to substantially completely depolymerize the unreacted styrene compound prior to reuse. Generally, passage of the vaporized styrene compound through the liquid unsaturated fatty acid compound is continued for a time sufficient to provide a copolymer product containing from about 10% to about 60% by weight of the styrene compound.

The process of the present invention is suitable for either batch or continuous operation.

The styrene compounds which are suitable for use in the present invention are preferably those which conform to the following general formula:

wherein R is the hydrogen atom or a lower alkyl group of not more than 2 carbon atoms, X is the hydrogen atom, the hydroxyl group, a halogen atom, a lower alkoxyl group of not more than 3 carbon atoms, or a lower alkyl group of not more than 3 carbon atoms, and $n$ is an integer of from 1 to 5. Typical suitable styrene compounds include: styrene, alpha-methyl styrene, para-methylstyrene, para-chlorostyrene, para-fluorostyrene, meta-chlorostyrene, meta-fluorostyrene, meta- and para-trichloromethylstyrenes, meta- and para-trifluoromethylstyrene, ortho- and meta-hydroxystyrenes, methoxy-styrenes, and the like.

The present invention is applicable to the styrenation of drying oil fatty acid compounds which term is used to include drying oils, drying oil fatty acids, synthetic drying oils, and drying oil fatty acid- or drying oil-modified synthetic resinous product such as drying oil fatty acid-modified alkyd resins and drying oil acid-modified condensation products of polyhydric phenols with polyfunctional alcohol-contributing reactants, such as polyhalohydrins, epihalohydrins, or polyepoxides. Typical representative drying oil fatty acid compounds which can be employed in the process of the present invention include: tung oil, linseed oil, soybean oil, dehydrated castor oil, perilla oil, fish oil such as sardine oils, oiticica oil, cottonseed oil, hempseed oil, poppyseed oil, safflower oil, and sunflower oil; fatty acids derived from the aforementioned drying oils; partially polymerized drying oils such as partially polymerized linseed oil; oxidized drying oils such as oxidized soybean oil; synthetic drying oils such as are obtained by the esterification of fatty acids derived from aforementioned drying oils with polyhydric alcohols, for example, glycerol, pentaerythritol, mannitol, sorbitol, and polypentaerythritol; drying oil-alkyd resins such as are obtained by the reaction of a drying oil fatty acid with a polyhydric alcohol such as glycerol, diethylene glycol, pentaerythritol, dipentaerythritol, sorbitol, mannitol, trihydroxymethylaminomethane, trimethylolpropane, etc., and a polycarboxylic acid such as maleic anhydride, fumeric acid, phthalic acid, adipic acid, sebacic acid, cyclopentadiene-maleic anhydride adduct, terpene-maleic acid adduct, 4-cyclohexene-1,2-dicarboxylic acid, etc.; and drying oil fatty acid-modified condensation products of polyhydric phenols such as resorcinol, hydroquinone, catechol, phloroglucinol, bisphenol, p,p'-dihydroxy benzophenone; o,p,o'p'-tetrahydroxydiphenyl dimethyl methane, hematoxylin, polyhydric anthracenes, polyhydric naphthalenes, etc.; with polyhalohydrins such as glycerol dichlorhydrin, beta-methyl glycerol dichlorhydrin, epihalohydrins such as epichlorhydrin, epibromhydrin, epihalohydrins of mannitol, sorbital, and erythritol, or polyepoxides such as bis-(2,3-epoxypropyl)ether, butylene dioxide, diepoxides of mannitol, sorbitol, etc.; and the like drying oil fatty acid compounds. Drying oils and drying oil fatty acids are preferred for use in the present process.

The invention is illustrated by the following example which is not to be construed as limiting the specification and claims in any manner:

EXAMPLE

A series of tests were carried out as described below in which linseed oil was copolymerized with styrene under varying conditions.

A measured amount of linseed oil was placed in a reaction vessel which was provided with an annular channel at its upper portion and with a narrow vapor inlet near its base. The reaction vessel was placed in a molten metal bath. The linseed oil was heated to the desired temperature while a stream of nitrogen was passed therethrough at a constant rate. In order to remove traces of moisture and to insure decomposition of any peroxide present, addition of styrene was not begun until 15 minutes after the linseed oil had reached the reaction temperature. Styrene was added dropwise at a constant rate to the stream of nitrogen, the flow rate of which was maintained constant throughout the entire operation. As the resulting mixture was passed through the vapor inlet tube which was partially immersed in the molten metal bath, the styrene was vaporized. The resulting mixture of vaporized styrene and nitrogen was then passed through the linseed oil in the reaction vessel. The gas stream escaping from the liquid linseed oil and consisting of nitrogen and unreacted styrene was discharged from the reaction vessel together with any liquefied styrene which had collected in the annular channel and was passed through a condenser to liquefy the styrene in the gas stream. The liquid styrene was collected. The amount of liquid styrene collected amounted, in most cases, to about 95% of the styrene added to the linseed oil. The liquid styrene could be reused.

After the desired reaction time had elapsed, the supply of styrene was stopped. However, the temperature was kept constant for half an hour longer in order to convert or remove the last traces of monomer styrene. The mixture was then allowed to cool. The nitrogen stream was passed through the product during the continued heating and the subsequent cooling.

The amount of styrene which had reacted with the linseed oil was determined by weighing the oil before and after the reaction. The clarity of the product obtained was assessed and its viscosity and refractive index measured. The product was further examined for polystyrene content in accordance with the method described by B. Bokhout, Chem. Weekbl. 46, 836 (1950). The product was heated for two hours, using a reflux cooler, together with a sufficient quantity of a solution of one part of KOH in 3 parts of ethyl alcohol and 7 parts of toluene, to provide a molar excess quantity of 10% KOH with respect to the esterified fatty acid. After the solvents had been distilled off, the saponification products obtained proved, in each case, to be substantially completely soluble in methyl alcohol. No polystyrene had separated off. The results of the tests are summarized in Table I.

*Table I*

| Reaction Temperature (° C.) | Quantity Linseed Oil (Parts by Weight) | Styrene Added (Parts by Weight/Hour) | Duration of Reaction (Hours) | Nitrogen Stream (Parts by Volume/Hour) | Properties of Products Obtained ||||
|---|---|---|---|---|---|---|---|---|
| | | | | | Styrene Content (Percent by Weight) | Viscosity (Poises) | $n_D^{20}$ | Appearance |
| 280 | 40 | 0 | 4 | 3 | 0 | 2 | 1.4813 | Clear. |
| 280 | 40 | 30 | 4 | 3 | 13.4 | 56 | 1.5088 | Do. |
| 280 | 40 | 60 | 4 | 3 | 19.5 | 191 | 1.5173 | Do. |
| 280 | 40 | 60 | 4 | 3 | 20.0 | 219 | 1.5183 | Do. |
| 280 | 40 | 90 | 4 | 3 | 20.8 | 225 | 1.5193 | Very slight turbidity. |
| 280 | 40 | 120 | 4 | 3 | 21.7 | 315 | 1.5207 | Slight turbidity. |
| 280 | 40 | 60 | 4 | 10 | 8.2 | 57 | 1.5051 | Clear. |
| 280 | 40 | 60 | 4 | 8 | 12.7 | 97 | 1.5092 | Do. |
| 280 | 40 | 60 | 4 | 5 | 15.5 | 178 | 1.5145 | Do. |
| 280 | 40 | 60 | 4 | 3 | 19.5 | 191 | 1.5173 | Do. |
| 280 | 40 | 60 | 4 | 2 | 23.0 | 390 | 1.5219 | Very slight opalescence. |
| 280 | 40 | 60 | 4 | 1 | 28.0 | 1,070 | 1.5284 | Slight opalescence. |
| 280 | 40 | 60 | 2 | 3 | 8.1 | 10 | 1.5001 | Clear. |
| 280 | 40 | 60 | 3 | 3 | 14.1 | 49 | 1.5099 | Do. |
| 280 | 40 | 60 | 4 | 3 | 19.5 | 191 | 1.5173 | Do. |
| 280 | 40 | 60 | 5 | 3 | 21.9 | 349 | 1.5209 | Do. |
| 280 | 70 | 60 | 7 | 3 | 28.7 | 982 | 1.5290 | Do. |
| 290 | 70 | 60 | 4 | 3 | 20.0 | 532 | 1.5200 | Do. |
| 300 | 70 | 60 | 4 | 3 | 18.4 | 1,800 | 1.5230 | Do. |
| 310 | 70 | 60 | 4 | 3 | 14.6 | 6,000 | 1.526 | Do. |

We claim as our invention:

1. A process for copolymerizing a styrene compound of the formula

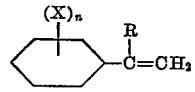

wherein R is a member of the group consisting of hydrogen and alkyl radicals containing 1 to 2 carbon atoms, X is a member of the group consisting of chlorine, alkoxy radicals containing from 1 to 3 carbon atoms and alkyl radicals containing from 1 to 3 carbon atoms, and n is an integer of from 1 to 5, the aromatic ring carbon atoms which are not attached to X and the $$-\underset{|}{\overset{R}{C}}=CH_2$$

group being attached to hydrogen, with a drying oil selected from the group consisting of unsaturated fatty acid glycerides and fatty acids derived from such glycerides, which comprises heating the said drying oil in the liquid phase to a temperature between 150° C. and 300° C., vaporizing the styrene compound in an inert gas and passing the gaseous mixture into and through the body of the heated liquid drying oil.

2. A process as in claim 1 wherein the styrene compound is styrene.

3. A process as in claim 1 wherein the drying oil is linseed oil.

References Cited in the file of this patent

UNITED STATES PATENTS

| 1,029,737 | Aylesworth | June 18, 1912 |
| 2,179,040 | Heuer | Nov. 7, 1939 |

OTHER REFERENCES

Hewitt et al.: J. Oil and Colour Chemists Assn., June 1946, pp. 109–128.

Boundy: Styrene, Its Polymers, Copolymers and Deriv., 1952, pp. 816–817.

Varnish Constituents, Chatfield, Leonard Hill Limited, London, 1953, page 120.